US 6,988,970 B2

(12) United States Patent
Dal Pra'

(10) Patent No.: US 6,988,970 B2
(45) Date of Patent: *Jan. 24, 2006

(54) ROCKER ARM ASSEMBLY FOR THE REAR DERAILLEUR OF A BICYCLE

(75) Inventor: Giuseppe Dal Pra', Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 87 days.

This patent is subject to a terminal disclaimer.

(21) Appl. No.: 10/722,986

(22) Filed: Nov. 26, 2003

(65) Prior Publication Data
US 2004/0113386 A1 Jun. 17, 2004

Related U.S. Application Data

(63) Continuation of application No. 09/994,718, filed on Nov. 28, 2001, now Pat. No. 6,685,586.

(30) Foreign Application Priority Data
Dec. 1, 2000 (IT) .................................. TO2000A1124

(51) Int. Cl.
F16H 59/04 (2006.01)
F16H 61/04 (2006.01)

(52) U.S. Cl. ........................................ 474/82; 474/80
(58) Field of Classification Search ............. 474/78–82; 264/257–258; 428/87, 75, 121, 192, 194, 428/233, 246, 67
See application file for complete search history.

(56) References Cited

U.S. PATENT DOCUMENTS

| 3,910,136 A | * | 10/1975 | Juy ................................ 474/82 |
| 4,809,843 A | * | 3/1989 | Dietzsch ....................... 198/771 |
| 4,895,553 A | * | 1/1990 | Nagano ........................ 474/80 |
| 5,316,834 A | * | 5/1994 | Matsuda et al. ............. 428/920 |
| 5,597,366 A | * | 1/1997 | Ozaki ........................... 474/82 |
| 5,624,336 A | * | 4/1997 | Kojima ......................... 474/82 |

FOREIGN PATENT DOCUMENTS

| EP | (0414214) A2 | * | 2/1991 | |
| EP | 0 449 074 A2 | | 3/1991 | |
| EP | (000461053) A1 | * | 12/1991 | ................... 474/80 |
| FR | (2539096) A | * | 7/1984 | ................... 474/82 |
| JP | (55-37313) A | * | 3/1980 | |
| JP | (64-90504) A | * | 4/1989 | |
| JP | (01-171583) A | * | 7/1989 | |
| JP | (04-222865) A | * | 8/1992 | |
| JP | (10-30633) A | * | 2/1998 | |
| TW | 408752 | | 10/2000 | |
| WO | WO 93/16910 A1 | * | 9/1993 | |

* cited by examiner

Primary Examiner—Marcus Charles
(74) Attorney, Agent, or Firm—Volpe and Koenig, P.C.

(57) ABSTRACT

Rocker arm assembly for the rear derailleur of a bicycle, comprising an outer plate (12) carrying a pivot pin (32), an inner plate (10) and a pair of idle transmission wheels (14) arranged between the outer plate (12) and the inner plate (10). The inner plate is made of metallic material and the outer plate is made of a structural fiber fabric incorporated in a thermoplastic material matrix.

20 Claims, 1 Drawing Sheet

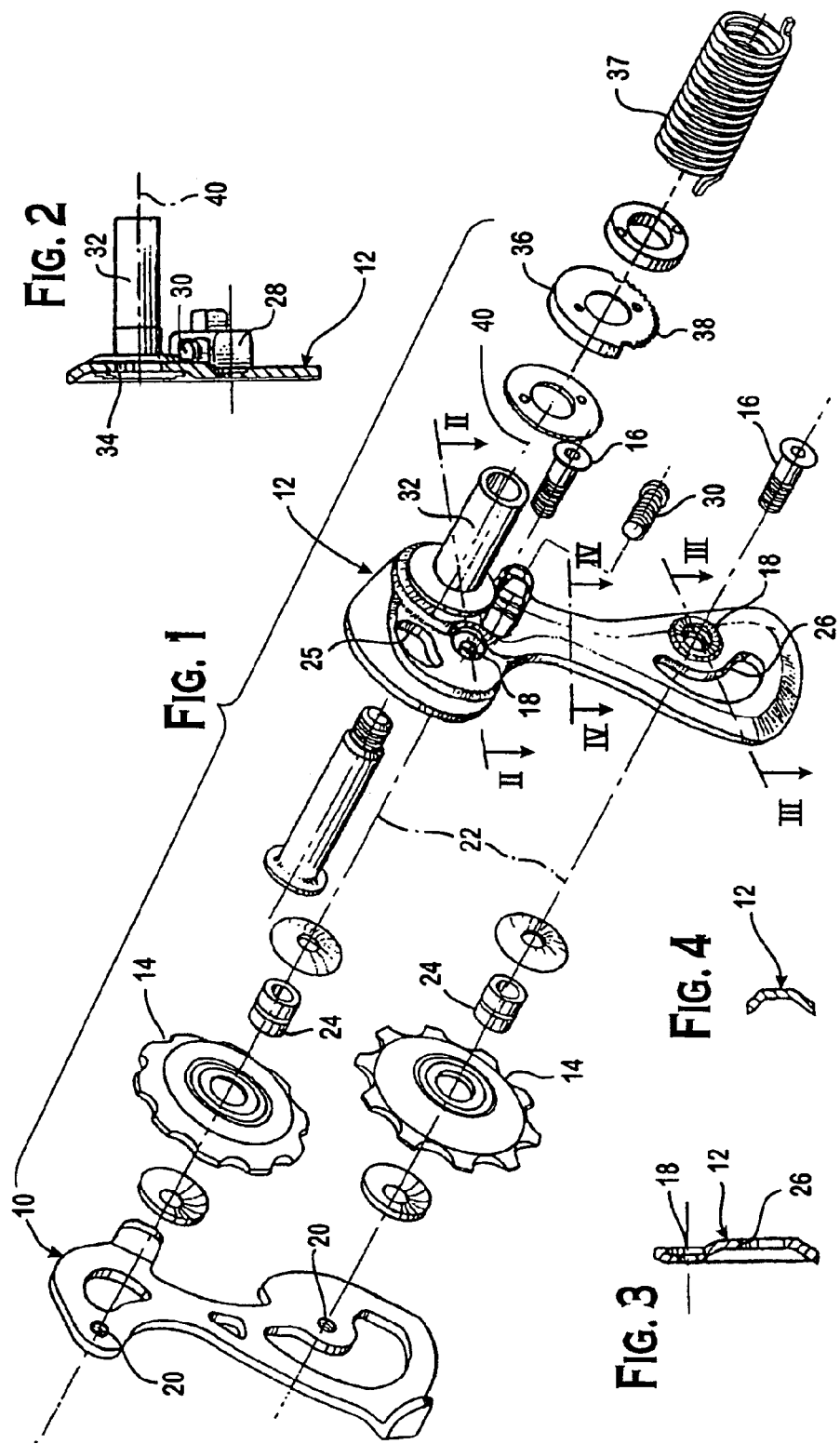

US 6,988,970 B2

ROCKER ARM ASSEMBLY FOR THE REAR DERAILLEUR OF A BICYCLE

CROSS REFERENCE TO RELATED APPLICATION(S)

This application is a continuation of U.S. Pat. No. 6,685,586 (application Ser. No 09/994,718), filed Nov. 28, 2001 which issued on Feb. 3. 2004, and is incorporated by reference as if fully set forth.

BACKGROUND

The invention relates to a rocker arm assembly for the rear derailleur of a bicycle. The rocker arm assembly comprises an outer plate carrying a pivot pin, an inner plate and a pair of idle transmission wheels arranged between the inner plate and the outer plate and intended to co-operate with the chain.

The field of components for competition bicycles is characterized by continuous research aimed at reducing the weight of single components without compromising performance, particularly in terms of structural resistance.

In rocker arm assemblies of the known kind, the front plate and the rear plate are both made of light metallic alloys and are reciprocally fastened by means of screws which define the rotation axes of the transmission wheels. The use of different materials that would provide a reduction in weight often puts problems in terms of maintaining structural resistance characteristics. Furthermore, the problem related to the dimensions of the plates of the rocker arm assembly cannot be neglected since this unit is arranged very close to the spokes of the wheel, when the chain meshes the pinion which is closest to the wheel.

In order to overcome the aforesaid drawbacks, the invention relates to a rocker arm assembly having the characteristics described herein.

SUMMARY

The rocker arm assembly according to the invention is characterized in that the inner plate is made of metallic material and the outer plate is made of a structural fiber fabric incorporated in a thermoplastic material matrix.

This solution provides high stiffness and small thickness of the inner plate which is more affected by problems of occupied space to prevent interference with the wheel. The outer plate has less problems of stiffness and occupied space and can be made of a lighter material, for example a composite carbon fiber-based material. Considering that the inner plate is made of metallic material, it can be provided with threaded holes as in the traditional solutions, for engaging the threaded ends of the screws defining the rotation axes of the transmission wheels. If the inner plate were also to be made of structural fiber fabric incorporated in resin, the problem of making the plate thicker would arise to ensure the same resistance to flexion and the increased thickness would cause an interference with the spokes of the wheel. Furthermore, making threaded holes in fiber fabric incorporated in a plastic material matrix would not be possible and threaded metallic inserts would have to be used. This would increase the problem of occupied space of the inner plate.

BRIEF DESCRIPTION OF THE DRAWING(S)

The invention will now be described, by the way of example only, with reference to the accompanying drawings wherein:

FIG. 1 is an exploded perspective view of a rocker arm assembly according to the invention, and FIGS. 2, 3 and 4 are cross-sections according to lines II—II, III—III and IV—IV in FIG. 1, respectively.

DETAILED DESCRIPTION OF THE PREFERRED EMBODIMENT(S)

With reference to the drawings, FIG. 1 illustrates the rocker arm assembly comprising an inner plate 10, and outer plate 12 and a pair of transmission wheels 14. The plates 10, 12 are fixed in a conventional way by means of a pair of screws 16 which extend through respective non-threaded holes 18 of the outer plate 12 and engage respective threaded holes 20 of the inner plate 10. In a conventional way, the screws 16 define the rotation axes 22 on which the transmission wheels 14 are freely rotationally mounted. Respective bushings 24 are interposed between the screws 16 and the wheels 14.

According to the invention, the inner plate 10 is made of metallic material, preferably aluminum or aluminum alloys, while the outer plate 12 is made of a structural fiber fabric incorporated in a plastic material matrix.

Preferably, the fabric is a carbon based fabric and the plastic material is preferably of the thermosetting type. The outer plate 12 is made by compression moulding of sheets readily available on the market, consisting of sheets of structural fibres coated with thermoplastic resin. During moulding, the outer plate assumes the definitive shape illustrated in the figures, with a transversal cross-section shaped as a shallow channel, as illustrated in FIGS. 3 and 4, to increase the flexion and torsion stiffness. The holes 18 for the screws 16 and lightening holes 26 are formed during moulding. Preferably, an integral element 28 made of plastic material projecting from a an outer face of the outer plate 12 is also formed during moulding. The element 28 carries a freely rotating worm screw 30.

A hollow pin 32 of metallic material, preferably steel, is fastened by caulking in a hole 34 of the plate 12. A regulation wheel 36 whose toothing 38 meshes the worm screw 30, is rotationally mounted on the pin 32. The regulation wheel 36 co-operates with a return spring 37 which tends to rotate the rocker arm assembly around the axis 40 of the pin 32. The relative position of the wheel 36 with respect to the pin 32 can be varied by turning the worm screw 30 and consequently varying the pre-load of the return spring 37.

In the assembled configuration, the inner plate 10 and the outer plate 12 form a cage structure which rotationally carries the transmission wheels 14. The fact of using a metallic material for the inner plate 10 and a structural fiber fabric incorporated in a thermoplastic resin for the outer plate 12 results in a situation which is an ideal compromise in terms of reducing weight and maintaining structural resistance with respect to the flexion stress, without causing problems of interference with the spokes of the wheel in the position in which the chain engages the pinion which is closer to the wheel.

What is claimed is:

1. A rocker arm assembly for a rear derailleur of a bicycle, the assembly comprising an outer plate having a pivot pin, an inner plate and a pair of idle transmission wheels arranged between the outer plate and the inner plate, wherein the inner plate is made of metallic material and the outer plate is made of a structural fiber fabric incorporated in a plastic material matrix, the outer plate includes an integral element made of a plastic material projecting from an outer face of the plate which carries an adjustment screw co-operating with a wheel rotationally mounted on said pivot pin.

2. The rocker arm of claim 1, wherein the plastic material is a thermo set.

3. The rocker arm of claim 1, wherein the plastic material is a thermoplastic.

4. The rocker arm of claim 1, wherein the fabric is a carbon-based fabric.

5. The rocker arm of claim 1, wherein said pivot pin carried by the outer plate is made of metallic material and is fastened to the outer plate by caulking.

6. The rocker arm of claim 1, wherein said outer plate has a cross-sectional profile which essentially has a shape of a shallow channel.

7. The rocker arm of claim 1, wherein the outer plate is obtained by compression molding.

8. A rocker arm assembly for use an a rear derailleur of a bicycle, the assembly comprising:

an inner plate, made of a rigid metallic material, including first and second tapped holes;

an outer plate having a pivot pin, made of a plastic composite material, including first and second through apertures respectively aligned with the first and second tapped holes, and connected to the inner plate via fasteners passing through the first and second through apertures and first and second tapped holes; and first and second idle gears positioned between the inner and outer plates and aligned with a respective one of the first and second through apertures;

wherein the outer plate includes an adjustment screw that engages a wheel rotationally mounted on said pivot pin.

9. The rocker arm assembly of claim 8 wherein the composite material is structural fiber fabric incorporated in a plastic material matrix.

10. The rocker arm assembly of claim 9 wherein the plastic material is a thermo set, and the composite material is compression molded.

11. The rocker arm assembly of claim 8 wherein the metallic material is aluminum alloy.

12. The rocker arm assembly of claim 8 wherein the outer plate further includes an essentially U-shaped cross section.

13. The rocker arm assembly of claim 12 wherein the outer plate further defines a plurality of apertures therethrough.

14. A bicycle derailleur rocker arm assembly comprising:

a rigid metallic inner plate having first and second tapped holes;

a plastic composite material outer plate having first and second through apertures respectively aligned to oppose the first and second tapped holes and a pin which extends away from the inner plate;

first and second idle gears positioned between the inner and outer plates and aligned with a respective one of the first and second through apertures;

fasteners passing through the first and second through apertures and engaging a respective one of the first and second tapped holes;

a regulation wheel mounted on the pin; and a return spring that connects with a hole in the regulation wheel and rotates the assembly about the pin.

15. The assembly of claim 14 wherein the composite material is comprised of a structural fiber fabric in a plastic matrix.

16. The assembly of claim 15 wherein the plastic matrix is a thermo set.

17. The assembly of claim 14 wherein the composite material is compression molded.

18. The assembly of claim 14 further comprising a worm screw for varying the return spring's tension.

19. The assembly of claim 14 wherein the outer plate further includes an essentially U-shaped cross section.

20. The assembly of claim 14 wherein the metallic material is aluminum alloy.

* * * * *